United States Patent [19]

Durham

[11] Patent Number: 4,787,659

[45] Date of Patent: Nov. 29, 1988

[54] APPARATUS AND METHOD FOR RETRIEVING ARTICLES LOST IN DRAINS

[76] Inventor: R. Richard Durham, 25841 Shoemaker Rd., Circleville, Ohio 43113

[21] Appl. No.: 130,525

[22] Filed: Dec. 9, 1987

[51] Int. Cl.[4] ........................... B25J 1/02; F16L 55/00

[52] U.S. Cl. .................................. 294/1.1; 15/104.05; 15/104.18; 138/93; 294/19.1; 294/98.1

[58] Field of Search ...................... 294/1.1, 19.1, 86.1, 294/86.15, 86.24, 86.4, 93, 98.1, 99.1, 119.3; 4/255–257; 15/104.05, 104.16–104.19, 104.31, 104.32, 104.33, 212; 134/24, 166 C, 167 C; 138/93; 166/99, 120, 187, 212

[56] References Cited

U.S. PATENT DOCUMENTS

| | | | |
|---|---|---|---|
| 58,265 | 9/1866 | Keiler | 15/212 |
| 1,088,459 | 2/1914 | Shade | 138/93 |
| 1,180,182 | 4/1916 | Petersen | 15/104.05 X |
| 1,308,469 | 7/1919 | Amet | 15/104.16 |
| 4,021,265 | 5/1977 | Guenther | 15/104.18 X |
| 4,398,565 | 8/1983 | Williamson | 138/93 |
| 4,609,042 | 9/1986 | Broadus et al. | 138/93 X |

FOREIGN PATENT DOCUMENTS

| | | | |
|---|---|---|---|
| 1179693 | 10/1964 | Fed. Rep. of Germany | 15/104.19 |
| 579129 | 7/1946 | United Kingdom | 138/93 |

*Primary Examiner*—Johnny D. Cherry

*Attorney, Agent, or Firm*—Francis T. Kremblas, Jr.

[57] ABSTRACT

A device for retrieving small items which have fallen into common residential drains and have become lodged between the drain inlet and the distal end of the drain trap. The device consists of a elongate tubular portion having an inflatable pouch or balloon fixed to one end and a resilient squeezable bulb at the opposing end. Manually depressing the bulb after insertion of the pouch beyond the trap causes the pouch to inflate and engage the side walls of piping of the drain. Lifting the inflated pouch upward to the drain inlet carries any loose items in front of the pouch to the drain inlet for retrieval.

3 Claims, 1 Drawing Sheet

FIG. 1
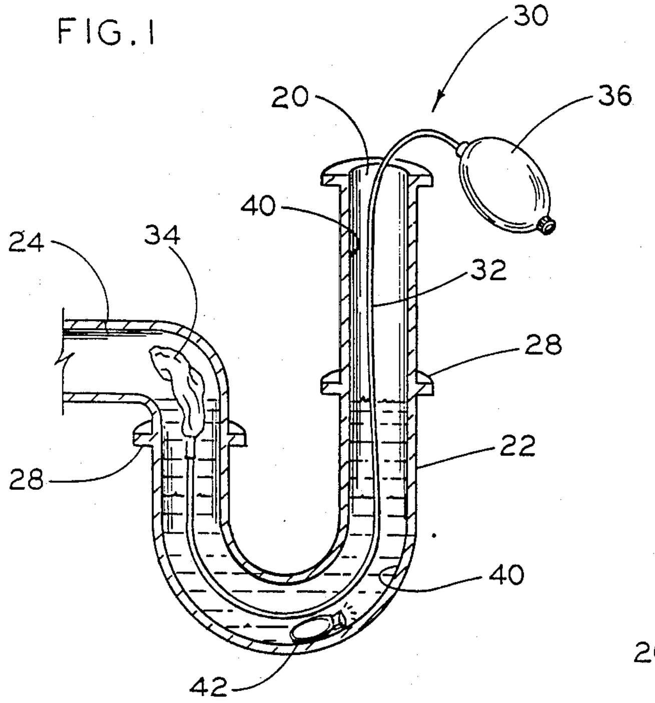
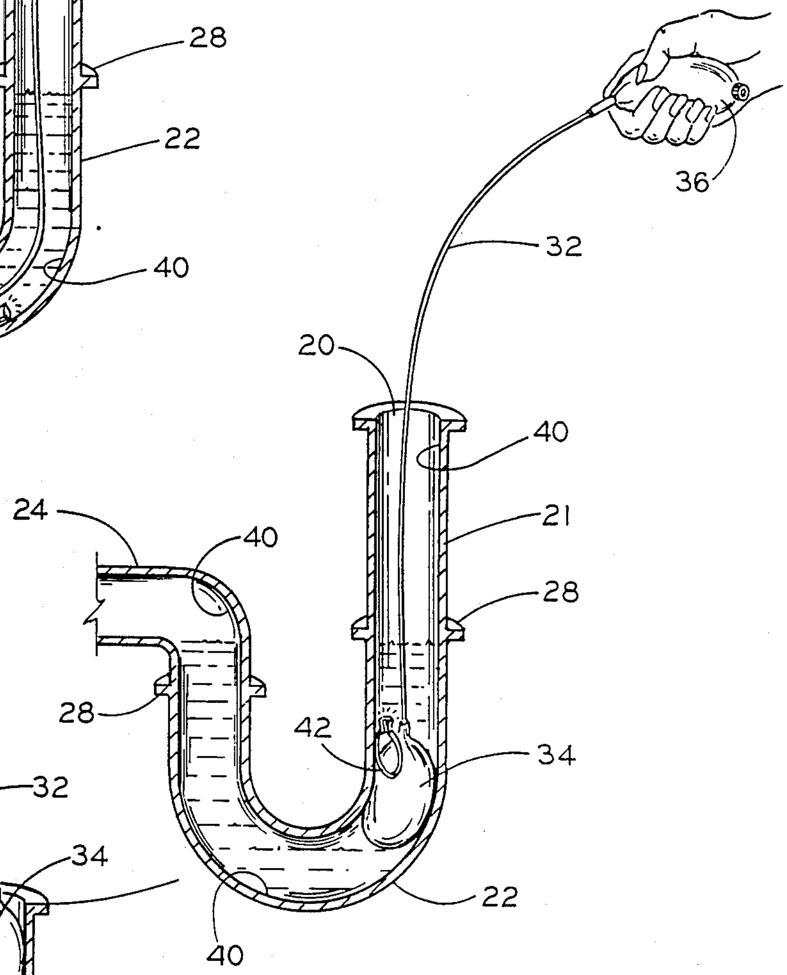
FIG. 2
FIG. 3
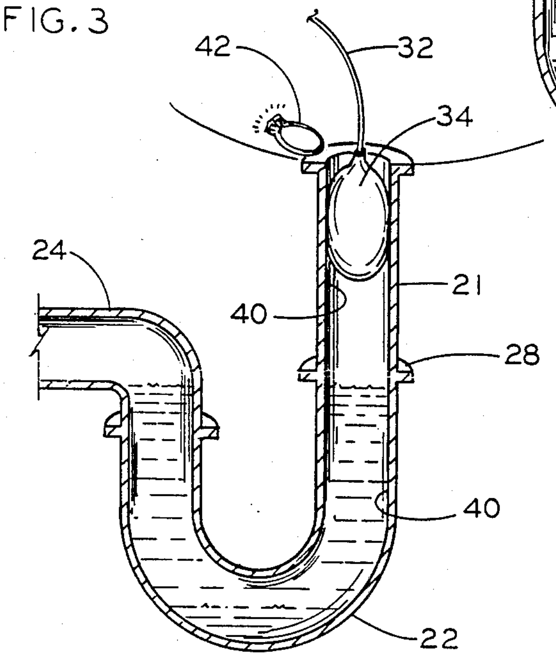

APPARATUS AND METHOD FOR RETRIEVING ARTICLES LOST IN DRAINS

BACKGROUND

Losing small items of value in residential drains is a relatively common occurrence. Rings, a contact lens or other items small enough to fall through the drain inlets of bathrooms and kitchen sinks are most likely to become lodged in the U-shaped trap of the drain plumbing. In order to retrieve the item, it is necessary to remove plumbing fixtures, including the trap portion, in order to obtain access to the lost item.

This involves a great deal of time and effort. Often a plumber is required to aid those persons lacking the tools or ability to properly remove the necessary piping and replace the same in working order. Prior to the present invention, no practical and economical method and device has been developed to solve the problem of retrieving such lost items in a simple and quick manner which did not require disassembly and re-assembly of the drain plumbing.

SUMMARY OF INVENTION

The present invention relates to a novel device and method for retrieving small items lost in common household drains between the drain inlet and the distal end of the trap portion of the plumbing. Generally, the device of the present invention comprises means to extend an inflatible pouch into the drain inlet in a deflated state to a position at or near the distal end of the trap portion of the drain conduit system. Also included are means to inflate the pouch to cause the sides thereof to engage the interior walls of the drain conduit. The inflated pouch can then be drawn outwardly through the conduit while the pouch remains inflated and slideably engages the interior walls. Any loose items are carried along the conduit ahead of the pouch. When the pouch reaches the drain inlet, the loose items may be easily retrieved. Then the pouch is deflated and pulled through the drain inlet opening. In the preferred embodiment, the device comprises an elongated hollow, flexible tube carrying the inflatable pouch at one end and a resilient hollow bulb at the other end. The inflatable pouch may be inflated by manually squeezing the hollow bulb and deflated by releasing the bulb.

In accordance with the present invention, a relatively simple and inexpensive device is provided which can be easily manipulated into and out of the drain plumbing to retrieve small items which have fallen into the drain.

Further, use of such a device does not require any disassembly of the drain piping nor damages it in any manner.

Additionally, use of the device of the present invention is relatively simple requiring no special skill or training.

In the preferred embodiment, the resilient manually depressible bulb provides a facile means to force air into the inflatable pouch at the distal end of the device and maintain the pouch in an inflated state as it is withdrawn to a position adjacent to the drain opening. Release of the bulb automatically permits the pouch to deflate to allow its removal through the drain inlet opening.

IN THE DRAWINGS

FIG. 1 is a side sectional view representing a conventional residential drain assembly including a trap and illustrating a retrieving device constructed in accordance with the present invention fully inserted into the trap;

FIG. 2 is a similar view as shown in FIG. 1, illustrating the retrieving device having the pouch fixed to its inner end inflated and being drawn outwardly toward the drain opening; and FIG. 3 is a similar view of those shown in FIGS. 1 and 2 illustrating the device of the present invention withdrawn to a position near the drain opening to force a small item up to the drain opening for retrieval.

DETAILED DESCRIPTION

FIG. 1 is an illustration of a retrieving device for use in connection with conventional residential drains such as found in sinks, bathrooms and the like. As shown in FIG. 1, the plumbing of a drain unit is illustrated apart from any sink or bath tub portion for simplicity of illustrating the use of the present invention.

A drain inlet opening 20 of the straight pipe portion 21, is typically connected to a U-shaped trap portion 22 which is disposed upstream from the pipe 24 to carry the water to other conduits generally connected to an outside drain system.

For purposes of description, the conventional perforated, removable cover portion often used with drain openings is not shown as it must be removed prior to insertion of the retrieving device indicated generally at 30. Further, the drain plumbing is represented in simplified fashion and the conduits or pipe portions would conventionally be connected by appropriate threaded unions such as at 28.

A device 30 constructed in accordance with the present invention is shown already inserted into the drain.

Retrieving device 30 includes an elongate flexible hollow tube portion 32 having an inflatable pouch or balloon 34 fixed thereto at one end. At the opposite end, a manually squeezable hollow bulb 36 is connected to tubular portion 32. As seen in FIG. 1, pouch 34 is in the deflated condition.

Tube portion 32 may be piece of conventional plastic tubing having an outer diameter substantially smaller than the piping comprising the drain system. Preferably, the outer diameter is chosen as small as reasonable, while maintaining necessary strength, so as not to be likely to push any small item which has fallen into the drain through the trap portion as it is being inserted therein. Conventional one-eighth inch plastic tubing has worked well in this regard and has more than sufficient durability for purposes of the present invention.

One end of tube portion 32 is inserted into the open mouth of inflatable pouch or balloon 34 which is fixed in sealed relationship around one of the tube end portions in any suitable manner, such as by an adhesive or by a heat shrinking tape for example.

Pouch 34 may comprise any suitable flexible, resilient material, such as a synthetic rubber, and is preferably slightly elongate or oval in shape. The size of the pouch depends upon the size of the drain conduit in which it is to be used; however, given its inflatable and resilient characteristics, a relatively small pouch easily works well in the typical one and one-half inch conduits found in residential plumbing.

As long as the pouch 34 will readily inflate to a diameter larger than the inner diameter of piping 21 and 22 without being stretched near its breaking point, the smaller sizes are preferred so as not to be likely to push a small item, such as a ring or contact lens, completely through trap portion 22 during insertion in its deflated condition.

It is preferred that the end of tubular portion 32 be inserted well into pouch 34 in order to provide a degree of stiffness to this end of the device. It is then much easier to insert pouch 34 in a deflated state through the drain opening 20 and through the conduit 22.

For purposes of the present invention, the inflatable resilient end portion formed by pouch 34 may be constructed in other fashions as long as its functional characteristics remain the same.

The opposing end of tubular portion 32 carries a hollow, resilient bulb 36 having an opening through which the end of tubular portion 32 may be inserted in a sealed relationship. Bulb 36 is preferably releasably connected to the end of tube 32 via a tight friction fit through an opening smaller than the diameter of tubular portion 32. Conventional hollow bulbs suitable for purposes of the present invention are commercially readily available and used in connection with other applications differing frm the present invention. Typically such bulbs are made from rubber or synthetic rubber materials.

The purpose of bulb 36 is merely to conveniently provide means to force a sufficient volume of air through tubular portion 32 to inflate pouch 34 sufficiently to engage the interior walls of the piping forming the drain portion 22. Further, by maintaining the bulb 36 in this depressed state, one can maintain the pouch 34 inflated as the device 30 is withdrawn from the drain. Merely releasing the bulb 36 permits the pouch 34 to deflate as a volume of air returns through tubular portion 32 into bulb 36 which then returns to its original normal configuration.

In operation, a user merely removes any cover which may be positioned over the drain opening 20 which possesses openings smaller than the pouch 34 in its normal deflated state and tubular portion 32. Then the pouch 34, fixed to the end of portion 32, is extended down pipe portion 21 and trap 22 a sufficient distance to assure the pouch 34 is disposed beyond the lower bend of the U-shaped trap 22.

Next, bulb 36 is manually depressed forcing air into pouch 34 to inflate pouch 34 to a size forcing the pouch to engage the interior walls of pipe 22.

Given the resilient nature of pouch 34, it will readily assume the necessary shape to forceably engage the interior walls 30 of pipe portions 21 and 22 as seen in FIG. 2. Further, upon drawing the opposing end of tubular portion 32 and bulb 36 away from opening 20, while maintaining bulb 36 depressed, pouch 34 will slide along the interior walls 40 forcing water and any loose items, such as ring 42, upwardly in front of the inflated pouch 34.

As pouch 34 nears opening 20, any water present will flow out of opening 20 and ring 42 will be disposed just below the opening 20 and typically be lying upon the upper end of pouch 34. From this position, the user may now reach ring 42 with one hand while maintaining bulb 36 depressed with the other hand.

If necessary, a pair of common tweezers or forceps may be used to pick up the ring 42 or any other small item which is to be retrieved. After the item 42 has been removed, simply releasing the manual pressure on bulb 36 permits pouch 34 to return to a deflated condition and it may be pulled through opening 20.

It should be noted that with certain common items of value which often are lost down a household drain, such as a contact lens, the lens may float in any water forced out of the opening 20 as the pouch reaches the terminal position shown in FIG. 3. Given the difficulty in seeing such an item, some care must be taken during its retrieval prior to releasing the pressure on bulb 36 to avoid the lens being washed back down the drain opening.

However, during testing of the device it has been found that with reasonable observation, small objects such as contact lens can be seen and retrieved without undo difficulty.

In view of the foregoing description, it should be understood that bulb 36 is efficient and very convenient, but not essential, to the operation of the device of the present invention. For example, one could blow air by mouth down tubular portion 22 to inflate pouch 34 and prevent its deflation by pinching or otherwise blocking the return flow to maintain the pouch inflated until it is withdrawn to a position such as shown in FIG. 3. Other equivalent means to functionally accomplish the same purpose could be employed without departing from the spirit of the present invention.

From the foregoing description, it should be readily understood that the device and method of the present invention provides an inexpensive, efficient and easy solution to a common problem which heretofore has not been satisfactorily solved. Given its ease of use and the small effort required, when an item such as a ring or contact lens is missing and one is not sure that it may have found its way down the drain, the drain can be quickly and easily checked using the teaching of the present invention. This is not likely to be done under such uncertain circumstances if one had to dismantle the drain trap as required prior to the present invention.

What is claimed is:

1. A device for retrieving small items lost in a common household drain of the type having a drain opening communicated to a U-shaped trap portion of the drain via conventional piping having interior walls, comprising in combination, an elongate, hollow, flexible tubing portion having an outer diameter significantly smaller than the piping of said drain and a length greater than the distance between said drain opening and a distal end of the U-shaped trap portion; an inflatable resilient pouch normally disposed in a deflated condition having a port opening mounted in sealed communication to one end of said flexible tubing portion to form a flexible tip; and means for inflating and deflating said pouch connectable to the opposing end of said tubing portion for selectively inflating said pouch to a diameter at least equal to the inner diameter of the piping of said drain for drawing said pouch in slideably and sealed engagement with said interior walls of said piping in a direction toward said drain opening while maintaining said pouch in an inflated condition; said means for inflating and deflating said pouch forming a closed pressure system with said pouch and said tubing.

2. The device defined in claim 1 wherein said last mentioned means includes a resilient hollow bulb having a port operably connected to said opposing end of said tubing portion in communication with said pouch and having a fluid volume at least sufficient to cause said pouch to be inflated to a size at least as large as the interior diameter of said piping upon manually depressing said bulb and to permit said pouch to be deflated upon releasing the depressing force on said bulb.

3. A method for retrieving relatively small items loosely lodged in a U-shaped trap portion of a conventional household drain including conventional piping having interior walls and a drain inlet, comprising the steps of: inserting a flexible, hollow tubing portion having an inflatable tip portion normally in a deflated condition into said drain inlet until said tip portion is disposed at or near a distal end of said U-shaped trap portion of said drain with the opposing end of said tubing portion maintained outwardly of said inlet, said tubing portion and said tip portion in its normally deflated condition having an outer diameter significantly less than the inner diameter of the piping of said drain; causing air pressure to be introduced into the opposing end of said tubing portion to inflate said inflatable tip portion into force-transmitting engagement with said piping; drawing said tubing portion and said inflated tip portion outwardly toward said drain inlet in slideable engagement with said interior walls of said piping until said inflated tip portion is closely adjacent to said drain inlet and maintaining said tip portion in an inflated condition; manually retrieving any loose items carried outwardly to said drain inlet in front of said inflated tip portion and then causing air to be released from the opposing end of said tubing portion to deflate said tip portion sufficiently to permit complete removal thereof through said drain opening.

* * * * *